United States Patent [19]

Ichikawa et al.

[11] Patent Number: 4,626,842
[45] Date of Patent: Dec. 2, 1986

[54] DISPLAY RADIO PAGING RECEIVER FOR VARIABLE LENGTH MESSAGES

[75] Inventors: Yoshio Ichikawa; Takashi Ohyagi, both of Tokyo, Japan

[73] Assignee: NEC Corporation, Tokyo, Japan

[21] Appl. No.: 526,587

[22] Filed: Aug. 26, 1983

[30] Foreign Application Priority Data

Aug. 27, 1982 [JP] Japan .................. 57-148985

[51] Int. Cl.$^4$ .................. H04Q 9/00; G08B 5/22
[52] U.S. Cl. .................. 340/825.44; 455/38
[58] Field of Search .................. 340/825.44, 825.48, 340/825.53, 311.1; 455/36, 38; 179/2 EC

[56] References Cited
U.S. PATENT DOCUMENTS

4,412,217 10/1983 Willard et al. .................. 340/825.44

*Primary Examiner*—Donald J. Yusko
*Attorney, Agent, or Firm*—Sughrue, Mion, Zinn, Macpeak and Seas

[57] ABSTRACT

A radio paging receiver of the type having a display unit includes a plurality of storage cells respectively for storing received message words therein, and a data processing unit which is arranged to detect a match between a received address word and a subscriber's address word and proceed to sequentially store the received message words into the storage cells. A numeral indicating the degree of freshness of the received message word is generated and displayed simultaneously with the message word in response to to the operation of a reset key. An indication is given that a message word will follow if the length of message words is greater than the capacity of the display unit. A symbol is subsequently given with the display of the next message word to indicate that the message word being displayed is a continuation from the previous one if said total is greater than the number of digits.

5 Claims, 15 Drawing Figures

DISPLAY RADIO PAGING RECEIVER FOR VARIABLE LENGTH MESSAGES

BACKGROUND OF THE INVENTION

The present invention relates to a radio paging receiver having a display unit.

In radio paging systems demands have arisen to transmit a sender's message and indicate it on a liquid crystal display. Due to the small size of the paging receiver, the number of display segments available is severely limited. One approach involves scrolling the message on a per character basis and another involves dividing the message into like blocks of characters and putting them on display on a per-block-at-a-time basis.

It is also known that in a paging receiver of the type having no built-in display the message is divided into sections and sequentially stored in memory cells and sequentially retrieved in response to the manual operation of a reset key in the order of freshness of the received message. It would be advantageous to combine this manually triggered resetting feature with the convenience of a visual display so that a block of characters is displayed on manual command. For displaying messages of variable word length it would be convenient to give a visual indication whether the displayed information is to be continued or it is a continuation from the previous one.

SUMMARY OF THE INVENTION

It is therefore an object of the present invention to provide a radio paging receiver having a display unit which generates a display of a tag indicating the status of a portion or the whole of a variable length message being displayed and a prediction of a subsequently displayed message portion.

The radio paging receiver of the invention is adapted to receive a radio-frequency paging signal bearing a preamble, a subscriber's address word and a message comprising at least one message word of a predetermined number of digits. The receiver comprises a display unit having a first segment and an array of second segments, the number of the second segments is an integral multiple of the number of the digits in the message word, a plurality of storage cells respectively for storing the message words therein, and a data processing unit. The data processing unit detects a match between the received address word and a subscriber's address word to sequentially store one or more of the received message words into the storage cells, generates a numeral indicating the degree of freshness of the received message, detects whether the total of the digits in the received message is greater than the number of the second segments, and generates in response to the operation of the reset key a display of the numeral on the first segment and a display of a stored message word on the second segments with an indication of the presence of a message word to be subsequently displayed if said total is greater than the number of the digits, or generates a display of a symbol on the first segment indicating that the message word being displayed is a continuation from the previously displayed message word if said total is greater than the number of digits.

BRIEF DESCRIPTION OF THE DRAWINGS

The present invention will be described in further detail with reference to the accompanying drawings, in which.

DETAILED DESCRIPTION

Figure 1:
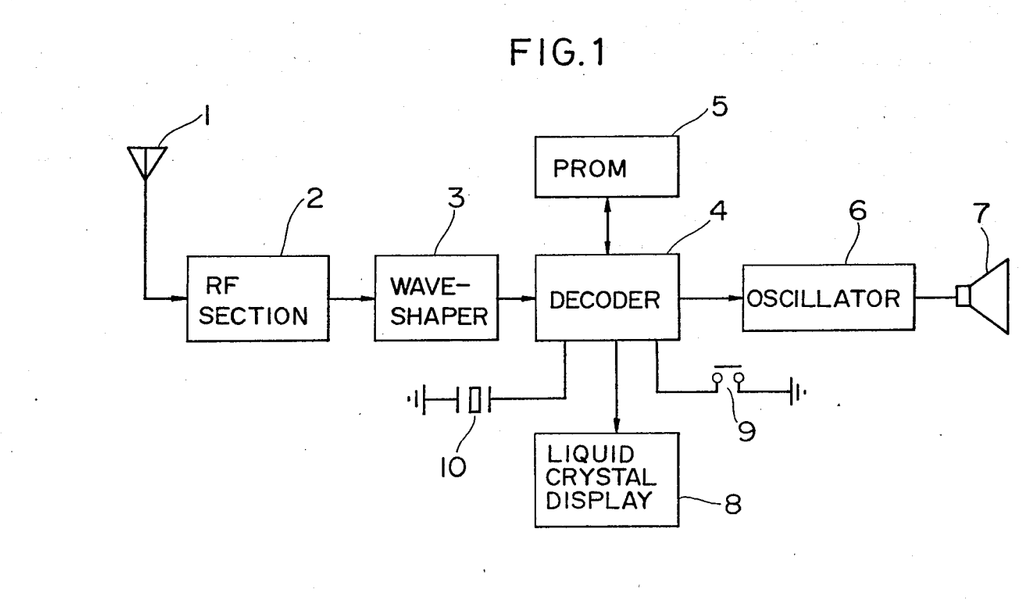
FIG. 1 is a schematic illustration of a radio paging receiver embodying the invention.

A radio paging receiver embodying the invention, shown at FIG. 1, generally comprises an antenna 1, a radio frequency section 2 which demodulates a radio-frequency paging signal intercepted by the antenna into the original baseband signal, and a waveshaping circuit 3 that shapes the baseband signal into clear pulses suitable for processing in a decoder 4. The decoder 4 checks to see if the receiver is being addressed by consulting with a programmable read-only memory 5 in which the owner's address word is stored. An audio frequency oscillator 6 is coupled to the decoder 4 to provide an audio frequency signal when the received address word matches the stored address and energizes a loudspeaker 7 to give an alert signal. The warning signal is reset when the owner presses a key 9. A 12-digit liquid crystal display 8 is coupled to the decoder 4 to provide a visual indication of the received message on a per 10-digit basis. The decoder 4 is a microprocessor-based control unit which operates on a time base determined by a crystal 10.

Figures 2A, 2B:
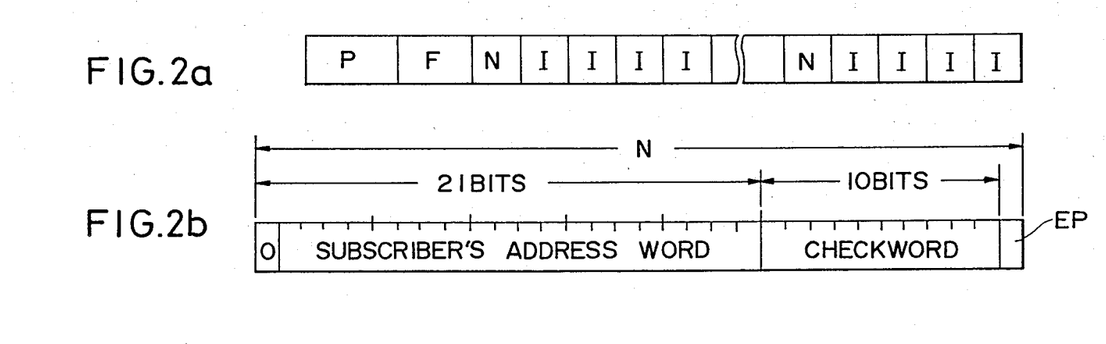
FIGS. 2a to 2c are illustrations of the data structure of a paging signal.
Figure 2C:
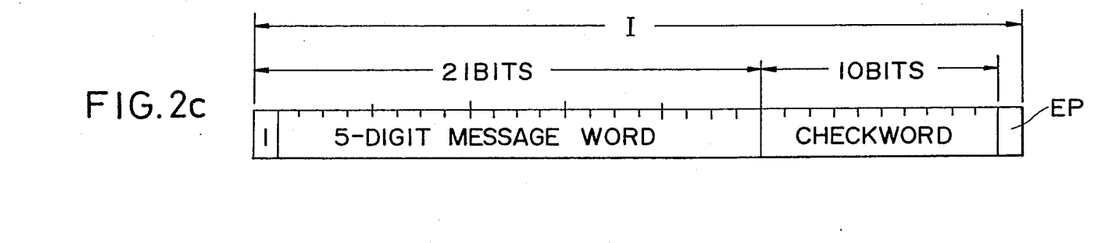

The data structure of the paging signal is shown in FIG. 2a. The signal comprises a series of blocks each containing a subscriber's address frame N and a subsequent series of message frames I. The sequence of blocks is preceded by a preamble P followed by a frame synchronization word F. In the present embodiment, a maximum of four messages can be transmitted. The same paging signal is repeatedly transmitted for confirmation. The word formats of the address and message frames are illustrated in FIGS. 2b and 2c, respectively. The address frame comprises 32 bits of information organized into 21 bits of address information and 10 bits of checkword followed by an even parity bit EP. The address information bits start with a binary "0" for identifying that the remainder 20 bits are a subscriber's address word which comprises five digits of 4 bits each in binary coded decimal notation (BCD). Similarly, the message frame comprises 32 bits of information organized into 21 bits of message information and 10 bits of checkword followed by an even parity bit EP. The message information bits start with a binary "1" for indicating that the remainder 20 bits are a message word which likewise comprises five digits of 4 bits each in binary coded decimal notation.

Figure 3:
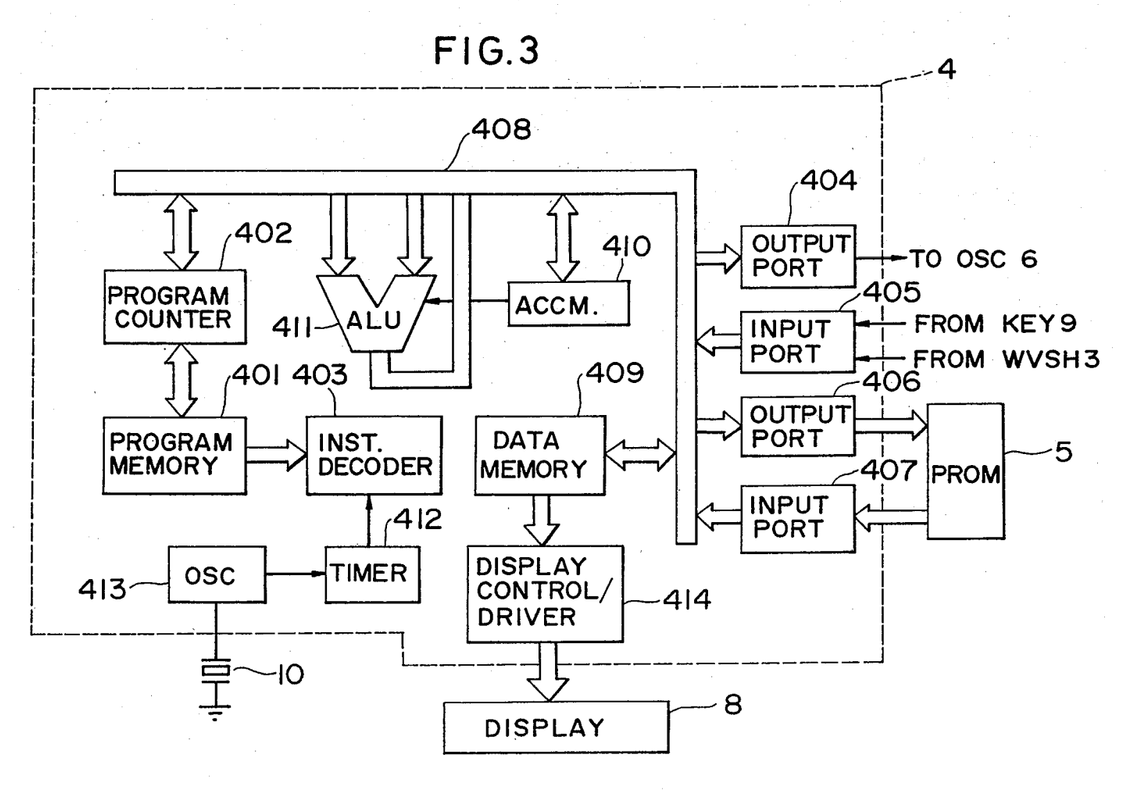
FIG. 3 is a block diagram of the decoder of FIG. 1.

FIG. 3 is an illustration of the detail of the decoder 4. The decoder comprises a program memory 401 which stores programmed instructions to be operated upon by an instruction decoder 403. A program counter 402 is incremented by one each time an instruction is read out of the program memory 401 into the instruction decoder 403 which operates on the instructions and sends control signals to various parts of the decoder. The decoder includes a data memory 409 which is coupled through a data bus 408 and through output and input ports 406, 407 to the PROM 5. The output of the data memory 409 is coupled to a display control/driver 414 which supplies the necessary data stored in the memory 409 to the display unit 8. An arithmetic and logic unit 411 and an accumulator 410 are connected to the data bus 408 for processing data they receive from the instruction decoder 403. A time base necessary for the instruction decoder 403 to read the received data at proper timing is derived from a circuit including an oscillator 413 coupled to the crystal quartz 10 and a timer 412.

Figure 4:
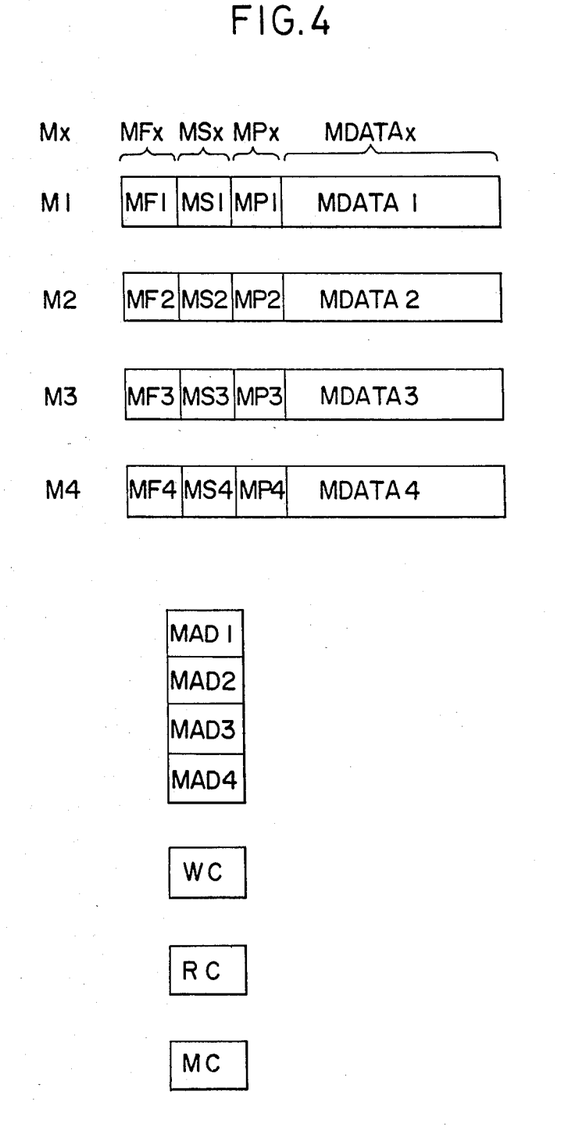
FIG. 4 is an illustration of the details of the data memory of FIG. 3.

As illustrated in FIG. 4, the data memory 409 includes storage areas designated M1, M2, M3 and M4, each comprising four memory cells MFx, MSx, MPx and MDATAx (where, x=1, 2, 3 or 4). A message having a maximum of 10 digits is stored in the memory cell MDATAx. A binary 1 in memory cell MFx indicates the presence of a message in the message memory cell MDATAx and a binary 0 in MFx indicates the absence of any message. If the length of the stored message is less than 10 digits, a binary 0 is stored in memory cell MSx and if the message length exceeds 10 digits a binary 1 is stored in MSx. MPx is loaded with a binary "1" exclusively when the message word stored in MDATAx is the first 10-digit part of a given message.

The data memory 409 further includes memory cells designated MADx (x=1, 2, 3 and 4), WC, RC and MC. The address codes of the storage areas M1 to M4 are stored in memory cells MAD1 to MAD4, respectively. If the received message comprises more than one message, the address code stored in memory cell MAD1 corresponds to the newest message word and the address code in cell MAD4 corresponds to the oldest message word. The memory cell WC serves as a storage location in which the count value of a message word counter is stored. The memory cell RC is used to store an address code of the address memory cells MAD and the cell MC is used as a message counter which is incremented by one in response to the operation of the reset key 9. The MC count value represents the degree of freshness of the message received.

FIGS. 5a-5c, 6a-6b are the flowcharts which describe a program of the decoder 4.

Figure 5A:
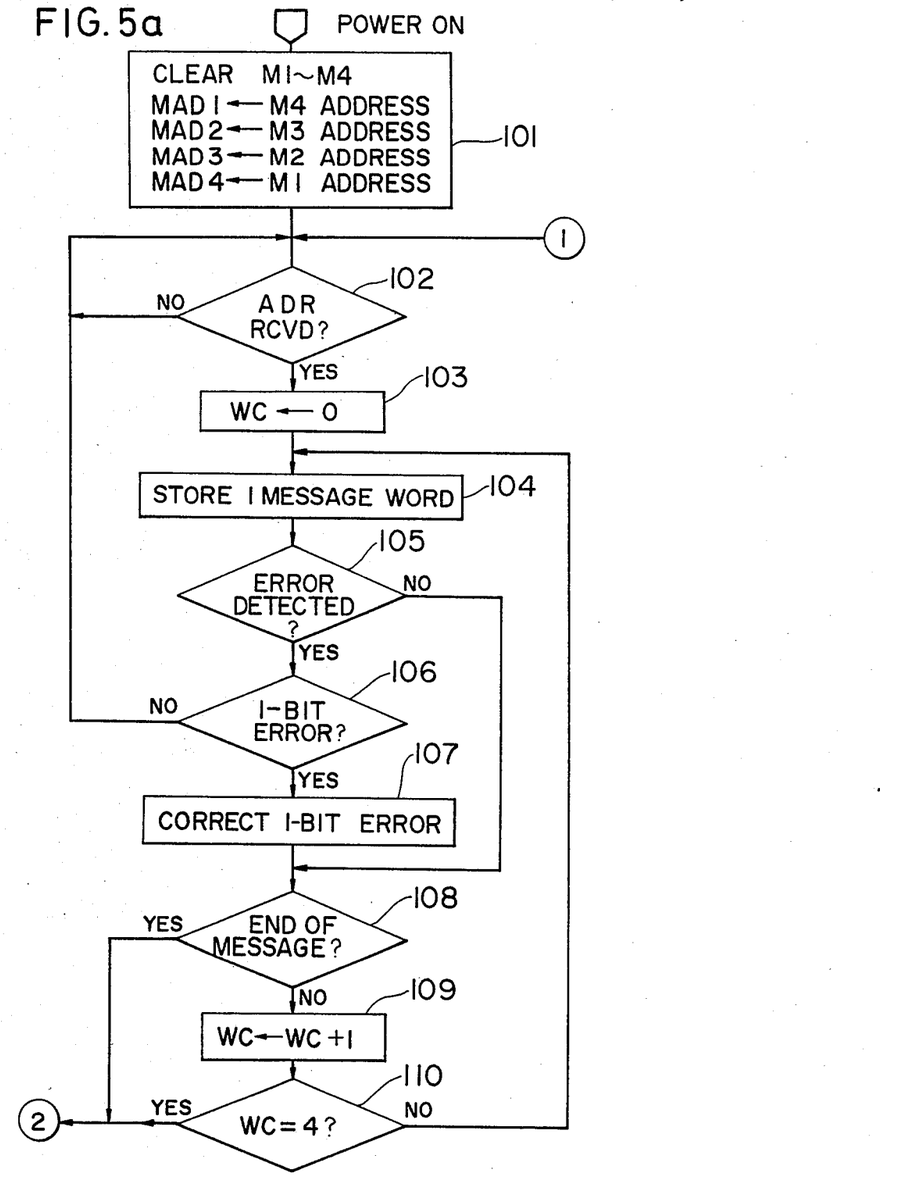
FIGS. 5a to 5c are a flowchart describing a sequence of instructions to be executed after the paging receiver is powered.
Figure 5B:
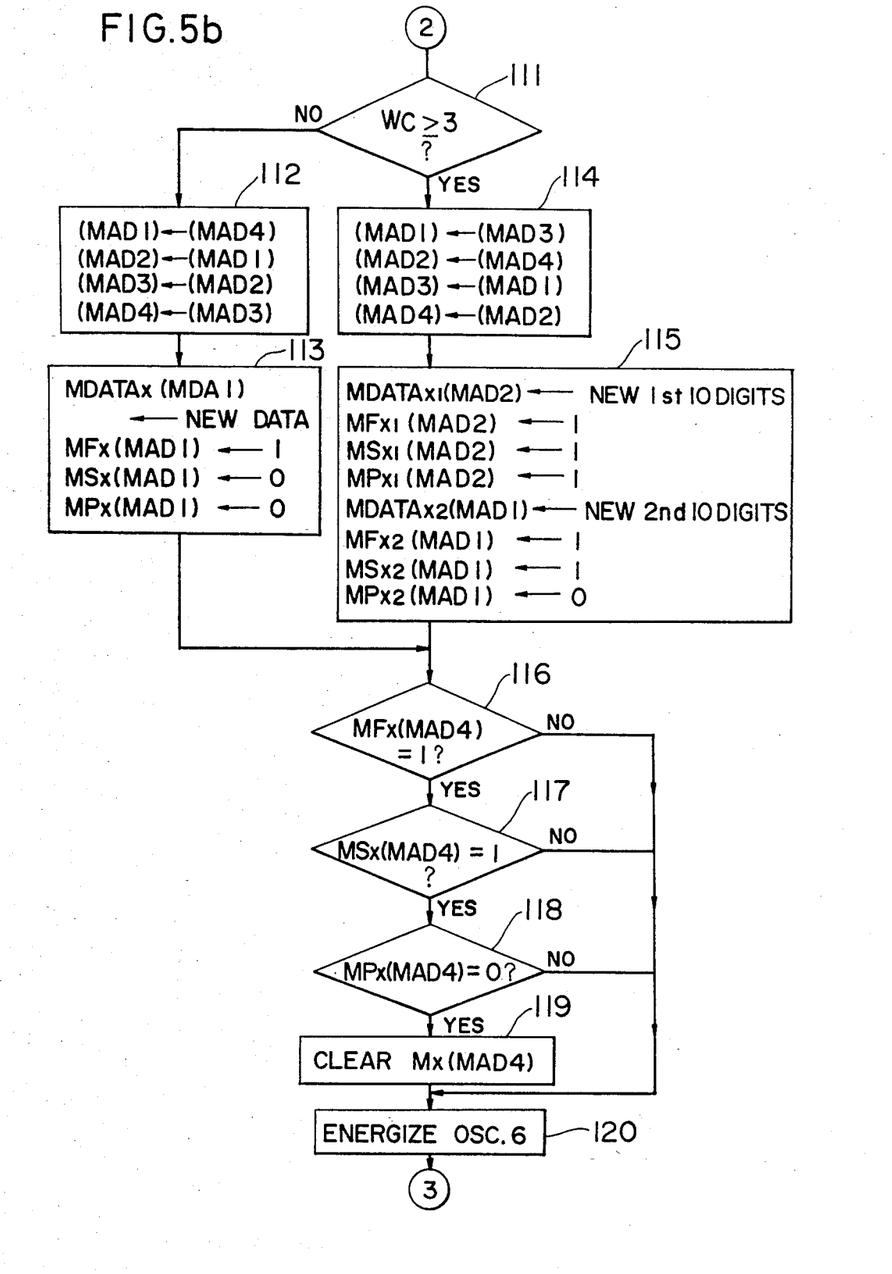
Figure 5C:
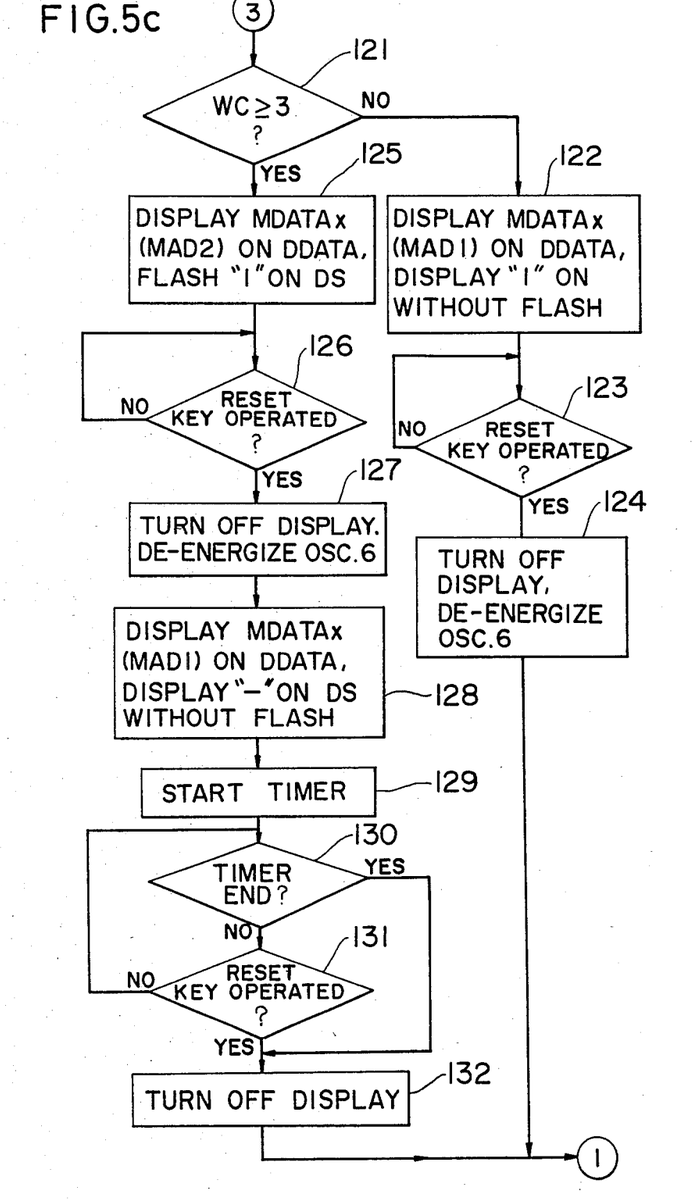

The program shown at FIGS. 5a-5c is concerned with generating a display of most recently received messages. When power is switched on, the storage areas M1 to M4 are cleared and the address areas MAD1 to MAD4 are initialized at Step 101 with the addresses of the areas M4, M3, M2 and M1, respectively. When a match occurs between a received address word and the owner's address word stored in the PROM 5 at Step 102, the message-word count area WC is reset to zero at Step 103 and a message word that follows is stored into a buffer memory at Step 104. The received message word is checked for error at Step 105 using a succeeding 10-bit checkword. If no error exists in the message word, the program execution exits to a Step 108 and if an error is detected, a Step 106 is executed to check to see if that error is a single bit error, and if so, this error is corrected at Step 107. If more than one bit is in error, the received message is discarded and the step returns to 102.

At Step 108, the most significant bit of the next message word is checked. If a binary "1" is detected, the decoder distinguishes it as an indication that the message still continues, and if a binary "0" is detected, the decoder recognizes it as the end of message and goes to a Step 111. Assume that binary "1" is detected at Step 108, the word counter WC is incremented by one at Step 109 and the Steps 104 to 110 are repeatedly executed until WC=4 is detected at Step 110. In this way, a message with up to a 4-word length can be received.

Figure 7:
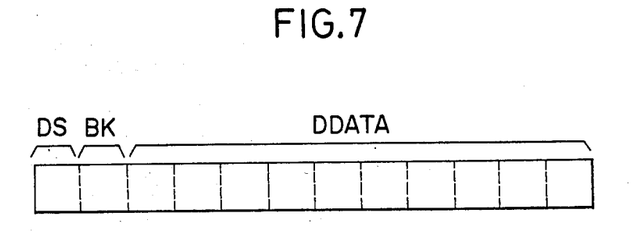
FIG. 7 is an illustration of a liquid crystal display.

As shown in FIG. 7, the display 8 comprises a linear array of 12 memory cells with the leftmost or first digit position DS being assigned a numeral indicating the status of one or two message words which are given in a data indicating portion designated DDATA including the third to twelfth memory cells which are separated by a blank cell BK. For display purposes, it is therefore necessary to determine whether the received message is less than 10 digits (1-word or 2-word length) or 11 to 20 digits (3-word or 4-word length). If a received message comprises 11 to 20 digits, the count value is equal to or greater than 3 and the program execution goes through a path including Steps 114 and 115, and if not it goes through a path including Steps 112 and 113.

At Step 112, the address codes of memory cells MAD1 to MAD4 are shifted in rotation by an increment of one address bit so that MAD1, MAD2, MAD3 and MAD4 are loaded with the previous address codes of MAD4, MAD1, MAD2 and MAD3, respectively, and at Step 113 the #1-#10 digit message words are transferred from the buffer memory to the memory cell MDATAx which is addressed by MAD1, and memory cells MFx, MSx, MPx are updated with "1", "0", "0" respectively.

At Step 114, the address words are shifted from one memory cell to another by an increment of two address bits so that memory cells MAD1, MAD2, MAD3, MAD4 are updated with the previous address words of MAD3, MAD4, MAD1 and MAD2, respectively. In the next Step 115, the first 10 digit part of the message data (which comprises 11 to 20 digits) is addressed by MAD2 and loaded into the memory cell MDATAx1 of storage area Mx1. Memory cells MFx1, MSx1, MPx1 are all loaded with a binary "1". Simultaneously, the second 10 digit part of the message is addressed by MAD1 and loaded into the memory cell MDATAx2 of Mx2, and memory cells MFx2, MSx2 and MPx2 are loaded with "1", "1" and "0", respectively. After execution of Steps 113 or 115, the program advances to a Step 116.

Therefore, the message length of ten digits or less requires only one memory cell, and otherwise two memory cells are required. There is a situation in which the second 10-digit part of the message is left in the memory where the oldest data are to be stored, if memory cells MFx (addressed by MAD4), MSx and MPx are loaded with "1", "1" and "0", respectively. This is an undesirable situation and the memory addressed by MAD4 must be cleared. Steps 116, 117 and 118 are provided to detect such situation. Step 119 is executed to clear the message word stored Mx which is addressed by MAD4.

Upon the execution of Step 119, the oscillator 6 is energized through output port 404 to generate an alert signal indicating that a message call is being received. The program execution goes through a Step 121 by checking the count value stored on WC if WC≧3 which is followed by a Step 122 if WC is smaller than 3 or followed by a Step 125 if WC is equal to or greater than 3.

Figure 8:
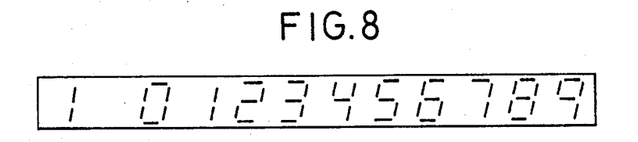
FIG. 8 is an illstration of a 10-digit message on display.

Thus, if the received message is of 1-word or 2-word length, the program execution exits to the Step 122. At Step 122, the message words in MDATAx are addressed by MAD1 and displayed on the portion DDATA and the memory cell DS is continuously shown to give a visual indication of numeral "1". Assume that the message word that the paging receiver has received most recently is "0123456789", this numerical message is displayed as illustrated in FIG. 8 and a numeral "1" is continuously shone in the DS position indicating that this message is the most recently received data and that its word length is 10 digits or less. The 10-digit message is put on display until the reset key 9 is depressed. A Step 123 is provided to to detect when the reset key 9 is operated and the sound alarm is turned off at Step 124. The program execution now returns to the Step 102 to set the receiver in readiness to receive the next paging signal.

If the received message is of a 3-word or 4-word length, the Step 125 is executed. If the received message has a 4-word length, the Step 125 involves addressing the first 10-digit part of the message in MDATAx by the MAD2 address code and generating a display of the first 10-digit part on the portion DDATA and flashing the DS position with a numeral "1". The flashed numeral "1" indicates that the message being displayed is the most recently received one and that it comprises the first 10-digit part of a more than 2-word length message and a following message word will appear next. The first 10-digit data is put on display until the operation of the reset key 9 is detected at Step 126 and the sound alarm is turned off at Step 127. A Step 128 is then executed by addressing the second 10-digit part of the message in MDATAx by the MAD1 address and putting it on display in the portion DDATA and continuously lighting up the memory cell DS with a symbol "-". The continuous indication of symbol "-" represents that the message being displayed is a continuation from the previous 10-digit word and no message words follow. A display timer is started at Step 129 by setting an interval of typically 8 seconds. When the 8-second interval expires or reset key 9 is depressed within that interval, the displayed data are extinguished when the instruction decoder 403 successively executes Steps 130, 131 and 132. The program execution returns to the Step 102 to put the receiver in readiness for reception of the next information.

Figure 6A:
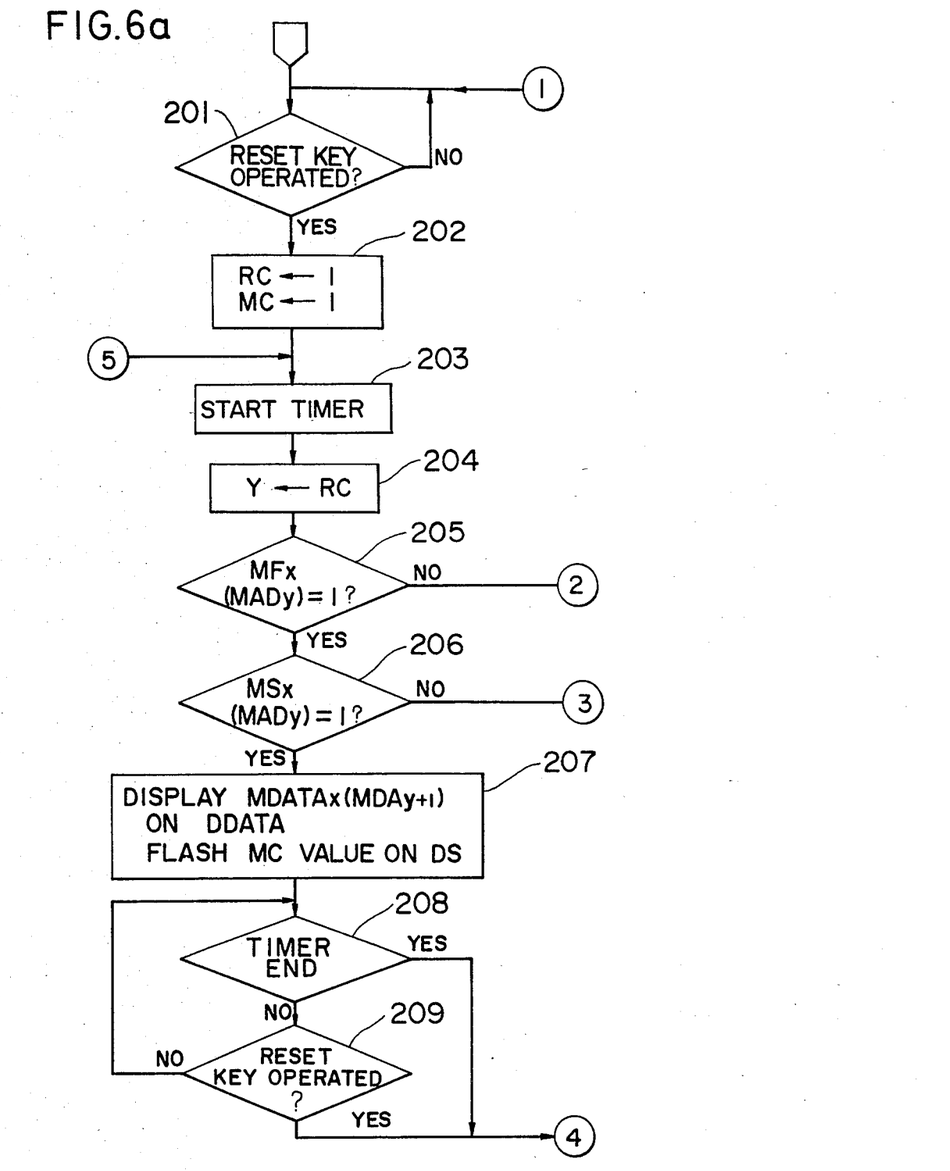
FIGS. 6a and 6b are a flowchart describing a sequence of instructions to be executed during standby periods.
Figure 6B:
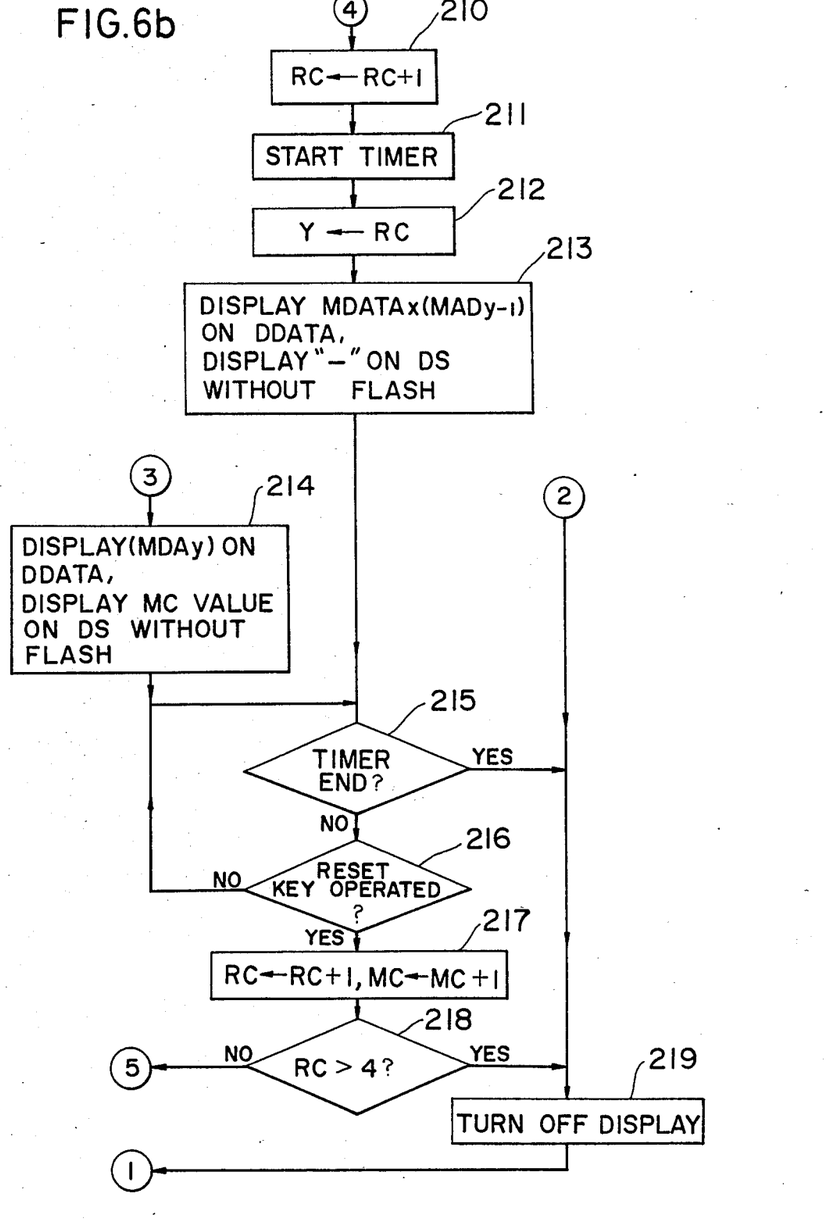

Description will now be concerned with FIGS. 6a–6b in which old messages are displayed in the order of freshness. The program starts with a Step 201 in which it is detected whether the reset key 9 is depressed during a standby period in which no audible nor visual indication is given. Step 202 is executed by updating the reset counter RC and word counter WC both with a binary "1". A display timer is started by setting an 8-second interval at Step 203. The count value in RC is transferred to the "y" register of the instruction decoder 403 at Step 204. If the binary state of MFx addressed by MADy is not binary "1" at Step 205 signifying that no message word is stored in any memory area Mx, the program execution goes to a Step 219 to put the receiver again in a standby condition. If a binary 1 is detected at Step 205, Step 206 is executed by determining the presence of a binary "1" or "0" in MSx. If "0" is detected in MSx at Step 206, the program execution proceeds to a Step 214 to address a 10-digit message word in MDATAx using the address memory MADy and displays it on a continuous mode on memory cells DDATA and a numeral corresponding to a bit stored in message counter MC. If "1" is detected in MSx at Step 206 signifying that a more than 2-word length message has been stored, the first 10-digit part of the stored message is addressed as a function of an address MADy+1 and displayed on the memory cells DDATA and the count value in MC is displayed on a flash mode on the memory cell DS at Step 207.

The result of the execution at Step 207 continues until the end of the timer action is detected at Step 208 or the operation of the reset key is detected at Step 209 while the timer action is still in progress. The reset counter RC is incremented by one at Step 210, and the timer is reinitiated at Step 211 and the Y register is updated with the just incremented RC value at Step 212. The program execution now advances to a Step 213 to address the second 10-digit part of the message in MDATAx in response to an address memory MADy−1 to display it on the memory cells DDATA and shines a symbol "-" on the memory cell DS on a continuous mode.

Figure 9A:
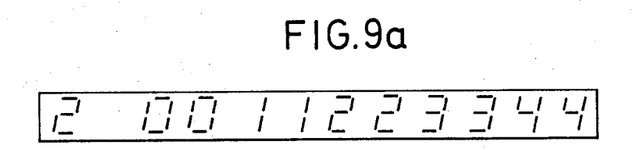
FIGS. 9a and 9b are illustrations of a 20-digit message on display.
Figure 9B:
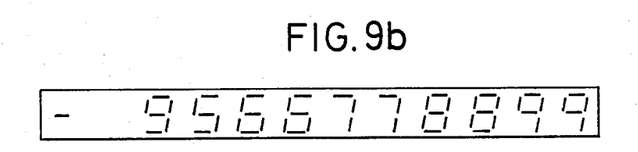

The Steps 213 and 214 are followed by a Step 215 in which it is detected whether the timer action has expired or not. If expired, the display 8 is extinguished at Step 219 and the program returns to the Step 201. If the reset key is depressed during the period of the timer action, the program executin goes through Step 216 to a Step 217 to increment the reset counter RC and message counter MC by one. Since the paging receiver is capable of storing four messages in $M_1$ to $M_4$ during standby periods, the Steps 203 to 217 need to be repeated until the reset key 9 is operated four times. Step 218 is provided for this purpose. Therefore, upon operation of the reset key 9 at Step 216, the next recent message is put on display with the memory cell DS being shown with a numeral "2" at Step 207, and so on, so that the oldest message is displayed with the DS memory cell shone with a numeral "4". For example, if the next recent message is a 4-word length code "00112233445566778899", the first 10-digit part appears with numeral "2" on memory cell DS as shown in FIG. 9a at Step 207 and the second 10-digit part appears with symbol "-" shone continuously at Step 213.

While mention is made of an example in which a message is composed of up to 20 digits, the message may comprise with up to 20 digits or more. For example, a 30-digit message may be put on display so that for the first 10-digit display the DS memory cell is flashed to indicate the number corresponding to MC. For the second 10-digit display, the symbol "-" is flashed to indicate that the message being displayed is a continuation from the previous 10-digit and that the next 10-digit will appear. For the last 10-digit display the symbol "-" is lit continuously to indicate the absence of no further message to be displayed.

What is claimed is:

1. A radio paging receiver adapted to receive a radio-frequency paging signal bearing a subscribers address word and a message comprising at least one message word of a predetermined number of digits, comprising:

display means having a first memory cell and an array of second memory cells, said second array being adapted to display at least one message word;

a memory having first and second groups of storage cells for storing the message therein, said first group storing one message word and said second group storing the remaining of said at least one message word;

a manually operated reset key; and data processing means for detecting a match between a received address word and the subscriber's address word, and if a match occurs, detecting whether the total number of digits contained in said message is smaller or greater than the number of said second memory cells, storing the received at least one message word into said storage cells of said first group if said digit total is smaller than said number of cells, storing the received at least one message word into said storage cells of said first and second groups if said digit total is greater than said number of cells, generating a character corresponding to the degree of freshness of the received message, where said degree is based upon the chronological sequence in which the message was received, providing in response to the operation of said reset key a display of said character on said first memory cell and a display of the message word stored in the storage cells of said first group on said second memory cells, generating an indication of the presence of a message word to be subsequentially displayed if said digit total is greater than said number of cells, providing a display of a symbol on said first memory cell indicating that the message word being displayed is a continuation from the previously displayed message word and providing a display of the message words stored in the storage cells of the second group of said second memory cells if said digit total is greater than said number of cells, said display of message words, characters and indications being adapted for simultaneous display.

2. A radio paging receiver as claimed in claim 1, wherein said indication is given by flashing the display means associated with said first memory cell.

3. A radio paging receiver as claimed in claim 1 further comprising a third group of storage cells, wherein said data processing means stores cell address words into said third group, the stored cell address words respectively representing the addresses of said first and second storage cells, wherein said data processing means further shifts the stored cell address words from one third group storage cell to another in rotation in response to the detection of said received and subscriber address word match so that the stored cell address word stored in a predetermined one of the third group storage cells corresponds to the newest of the sequentially received message words and reads the message word out of said first storage cells in response to the operation of said reset key to provide a display of the read message words in succession.

4. A radio paging receiver as claimed in claim 1 further comprising means for generating a sound in response to a signal applied thereto, wherein said data processing means generates said signal in response to the detection of said received and subscriber address word match to generate said sound and provides a display of the received message word stored in the first storage cells of the first group on said second memory cells and, in response to the operation of said reset key, terminates said signal to turn off said sound and provides a display of the received message words stored in the first storage cells of the second group on said second memory cells.

5. A method for visually indicating on a display unit a received message having at least one message word of a predetermined number of digits preceded by a subscriber address word, said display unit having a first memory cell and an array of second memory cells corresponding in number to a predetermined number of digits in a block of message words, the method comprising the sequential steps of:

detecting a match between the received address word and a subscribers address word;

detecting whether the total number of digits contained in said message is smaller or greater than the number of said second memory cells, if said digit total is smaller than said number of cells, storing the received message word into storage cells of a first group and, if said total is greater than said number of cells, storing the received message words into said storage cells of said first and second groups;

generating a character corresponding to the degree of freshness of the received message, which degree corresponds the the chronological sequence in which the received message was received;

if said digit total is smaller than said number of cells, providing in response to a manual command a simultaneous display of said character on said first memory cell and of the message word stored in said storage cells of the first group on said second memory cells; and if said digit total is greater than said number of cells, providing in response to a manual command a simultaneous display of said character and said indication on said first memory cell and of the message word stored in said storage cells of the first group on said second memory cells, and subsequentially providing in response to subsequent manual commands a simultaneous display of a character on said first memory cell and of a display of the message words stored in said storage cells of the second group on said second memory cells, said character indicating that the message word being displayed is a second part of the received message.

* * * * *